United States Patent [19]

Maher et al.

[11] Patent Number: 4,991,342
[45] Date of Patent: Feb. 12, 1991

[54] STEAM TREATMENT OF CROPS

[75] Inventors: Molly V. Maher; Robert J. Maher, both of Forbes, Australia

[73] Assignee: Riyate Pty. Limited, Australia

[21] Appl. No.: 327,595

[22] Filed: Mar. 23, 1989

Related U.S. Application Data

[60] Division of Ser. No. 880,176, Jun. 30, 1986, Pat. No. 4,873,772, which is a continuation-in-part of Ser. No. 583,385, Feb. 24, 1984, Pat. No. 4,604,857.

[30] Foreign Application Priority Data

Feb. 25, 1983 [AU] Australia ............................ 12434/83

[51] Int. Cl.⁵ ..................... A01G 13/06; A01D 14/02
[52] U.S. Cl. ........................................ 47/1.7; 56/16.4
[58] Field of Search .................... 47/1.01, 1.3, 1.44, 47/1.7, 2; 56/16.4; 100/71, 73

[56] References Cited

U.S. PATENT DOCUMENTS

| 1,709,270 | 12/1925 | Lang | 47/1.44 |
| 2,029,166 | 3/1934 | Hales | 47/1.7 |
| 3,830,014 | 8/1974 | Baker | 47/2 |
| 3,915,384 | 10/1975 | Diggs | 47/2 |
| 4,030,244 | 6/1977 | Tennes et al. | 47/1.7 |

FOREIGN PATENT DOCUMENTS 7041881 8/1980 Australia .
6191580 3/1982 Australia .

Primary Examiner—Henry E. Raduazo
Assistant Examiner—Michele A. Van Patten
Attorney, Agent, or Firm—Stevens, Davis, Miller & Mosher

[57] ABSTRACT

A crop conditioner having treatment chamber with front and rear ends adapted to enclose a longitudinal portion of a windrow laying on the ground over which the crop conditioner travels. A plurality of steam outlet nozzles within the chamber near the front end thereof directs steam to the crop.

5 Claims, 2 Drawing Sheets

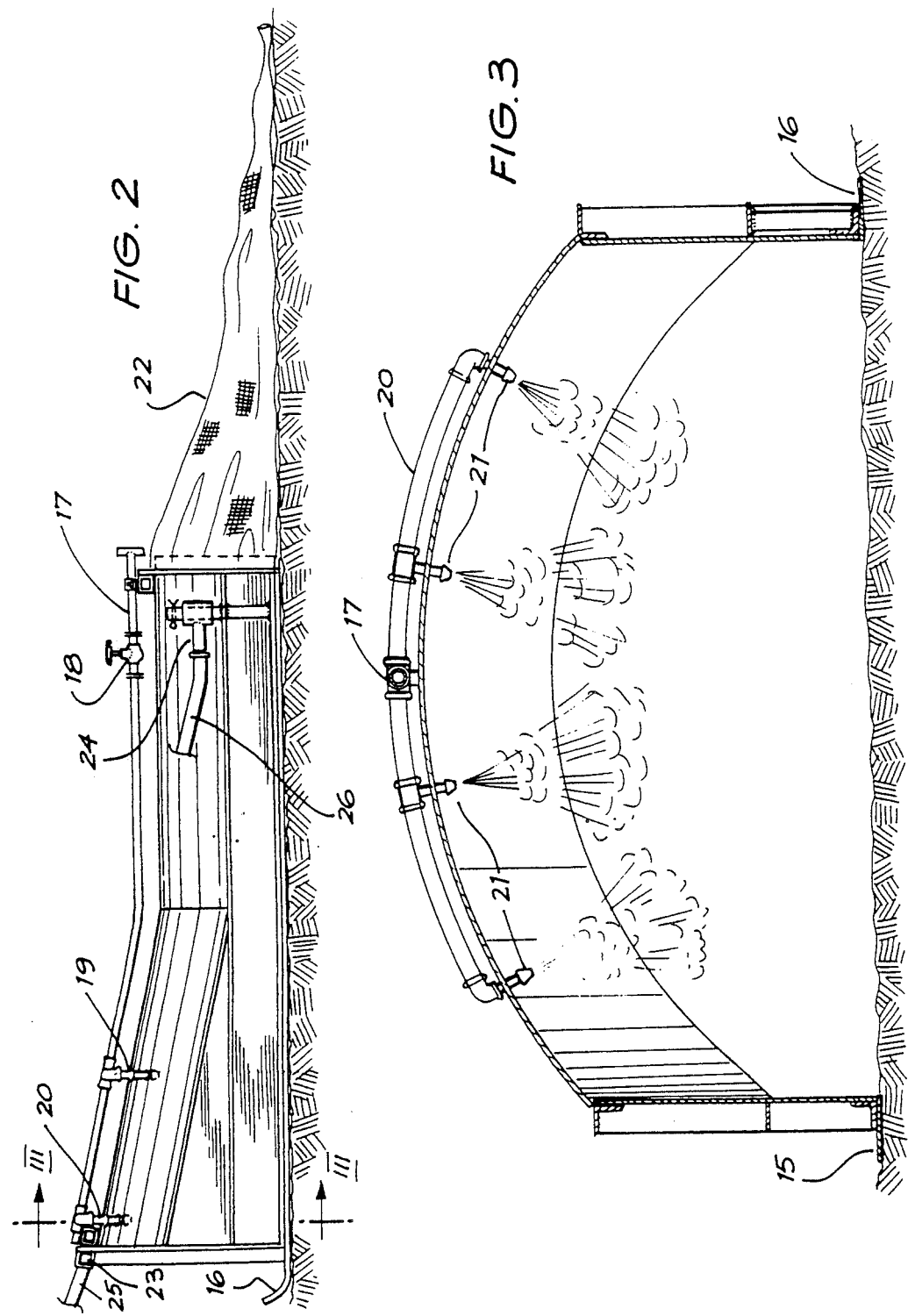

STEAM TREATMENT OF CROPS

RELATED APPLICATIONS

This is a division of application Ser. No. 880,176 filed June 30, 1986, now U.S. Pat. No. 4,873,772, which in turn is a continuation-in-part of Ser. No. 583,385 filed Feb. 24, 1984, now U.S. Pat. No. 4,604,857.

This invention relates to a method of treating crops such as hay, and more particularly to a method of conditioning crops prior to baling or other mechanical handling.

In this specification, the term "mechanical handling" includes treatment by:
(i) balers, either square or round and haystackers
(ii) hayrakes
(iii) windrow relocators
(iv) mobile chaff cutters
(v) mobile hammer mills
(vi) mobile pelletizing machines
(vii) mobile hay cubing machines
and the like.

For the sake of brevity the invention will be described in relation to the application of the invention to the conditioning of lucerne hay prior to baling but it is to be understood that the invention is not limited thereto.

BACKGROUND OF THE INVENTION

In general practice, lucerne and clover hay crops are mowed and then left for two to three days to enable the moisture content of the crop to be reduced to approximately 17%-20% of plant weight before baling. Unfortunately, by the time the stem of the crop plant has lost sufficient moisture to enable baling to proceed, the finer plant leaves may be overdried and consequently brittle. If the crop is baled in this condition, the leaf may be fractured from the stem and the bale may crumble during handling. The nutrient and market value of the crop will be reduced should fracture or powdering of the plant leaves occur. On the other hand, if the hay is too wet when baled it will not store well.

To overcome the problem of leaf brittleness, the hay is generally baled during the light dew conditions at night or in the early morning to enable the dew to remoisten the crop leaf sufficiently to reduce its brittleness and allow it to be handled without fracture or crumbling.

Understandably this process is unreliable and whilst waiting for appropriate dew conditions, losses of time may result. Furthermore, the hay will deteriorate whilst left in the field and it may also lose quality due to inclement weather damage.

One method of solving this problem has been to spray the crop with a water mist prior to baling. This method is generally unsuccessful because the relatively large size of the water droplets and consequent surface tension effects have prevented rapid penetration of the moisture into the leaf structure. Further, excess moisture remains on the stem and, as a result, the overall moisture content of the crop may be raised above the optimum level for baling.

It is therefore, an object of the present invention to provide a process which simulates the action of natural dew in which the crop is steam treated before handling or any major mechanised handling to create optimum moisture conditions at any time convenient to the grower.

SUMMARY OF THE INVENTION

According to the present invention there is provided a method of treating crop wherein the crop is subjected to steam treatment for a sufficient time to allow some of the steam to penetrate the structure of the leaf of the crop plant without moving, mechanically handling or disturbing the crop before steaming is commenced.

In a preferred form of the invention steaming is completed before the crop is moved, mechanically handled or disturbed. In another form of the invention, the crop may be moved, mechanically handled or otherwise disturbed prior to the completion of steaming.

The invention also provides a crop conditioner comprising a treatment chamber having opposed side walls and a top wall therebetween, an inlet to the chamber for receiving crop to be conditioned without moving, mechanically handling or disturbing the crop, a plurality of steam outlet nozzles within the chamber adapted to direct steam to the crop, and means for supplying steam to the outlet nozzles.

In a specific form of the invention, the crop is steam treated prior to the introduction of the hay into the bale forming chamber of a baling machine.

In the context of this specification the term "steam" embraces the resultant condensation of steam upon fall of temperature, a hot fine mist or droplets of water as well as molecular steam.

There are a number of advantages in using steam to condition the crop including:
(i) the moisture particles of the steam are sufficiently fine to permeate the leaf of the plant crop so as to restore almost instantaneously the malleable/supple properties of the leaf cells.
(ii) only the leaf is able to pick up significant moisture from the steam, the thick waxy plant stem of lesser relative surface area being less permeable to the moisture (thus the overall moisture content of the crop is not significantly increased).
(iii) dry steam can be generated in a mobile situation.

Hence the steam achieves preferential, rapid and effective moisture permeation of the leaf. The crop may be pretreated or concurrently treated with a chemical surfactant to permit the steam/water droplets to penetrate more readily the structure of the crop.

BRIEF DESCRIPTION OF THE DRAWINGS

In order that the invention may be more readily understood and put into practical effect, reference will now be made to the accompanying drawings in which:

FIG. 2 is a side view of the hay conditioner shown in FIG. 1, and, FIG. 3 is a view, on an enlarged scale, taken along the lines III—III of FIG. 2.

DETAILED DESCRIPTION

Figure 1:
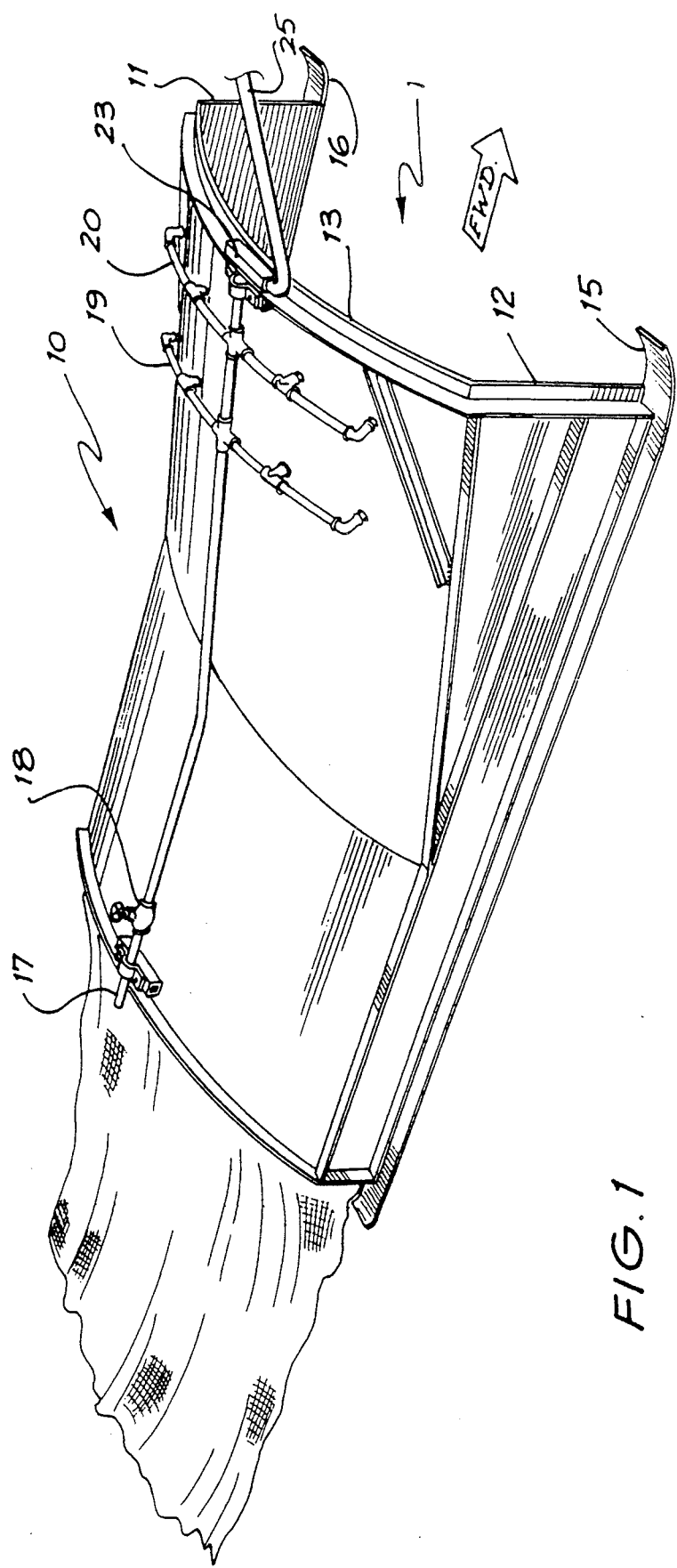
FIG. 1 is a perspective view of a hay conditioner according to one embodiment of the invention.

The hay conditioner shown in FIGS. 1 to 3 includes a treatment chamber 10 which in this instance consists of an elongated, box-like structure having opposed side walls 11 and 12 joined by a top wall or hood 13 of part circular cross section. The treatment chamber is so dimensioned that it will be able to span the width of a windrow.

The entrance 14 to the chamber 10 is free of any mechanical handling means so that the crop to be treated enters the chamber 10 (upon movement of the hay conditioner along the windrow) without being moved, mechanically handled or otherwise disturbed. The hay conditioner skids along the ground on skid means 15 and 16.

A steam manifold 17 having a stop cock 18 is adapted to be connected to any convenient supply of steam and extends along the top of the chamber 10 to branch manifolds 19, 20, although two manifolds are shown, it will be realized that one or more than two may be used.

Each of the manifolds 19, 20 has a plurality of steam outlet nozzles 21 (see FIG. 3) which direct steam into the chamber 10. A trailing cover 22 extends from the rear of the chamber 10 to retain some of the steam therebeneath so as to prolong the steam conditioning as long as possible before the crop is mechanically handled.

The hay conditioner may be connected to a hay baler, tractor or other self-propelled or drawn machine by means of cantilever arms raised and lowered by a hydraulic arrangement under the control of the operator of the machine. In this instance, the hay conditioner is adapted to be attached to the front of a side pick-up hay-baler and to this end one of the cantilever arms 26 is coupled to the rear pick-up point 24 of the hay conditioner and the other cantilever arm 25 is connected between the front pick-up point 23 and the tractor. It will be appreciated that the conditioner should be mounted on the hay-baler so that the longitudinal axis of the treatment chamber is in register with the centre line of the feed opening of the hay-baler.

It is preferred that the treatment chamber be of sufficient length to maintain the steam environment around the window for sufficient time to obtain optimum penetration of steam into the structure of the leaf of the dried lucerne.

The preferred mode of operation of the hay conditioner according to the embodiment of the present invention shown in the drawings is as follows: as the hay-baler is towed or otherwise moved along so as to traverse a windrow, the hay is undisturbed as it is steamed by jets of steam from the manifold. In a modification of the invention the windrowed material may be lifted or handled after steaming has commenced but before it is finished.

While the treatment chamber should be as short as possible to enhance manoeuvrability, it should nevertheless be long enough to condition hay properly in its passage thereover. The effective length of the chamber is increased by the use of the cover 22.

Steam may be supplied by a generator of any convenient kind. Empirical testing indicates that dry steam may be used; by "dry" steam is meant steam having less that 1.5% moisture content.

In one embodiment of the invention the treatment chamber is four meters long and using a 15 h.p. steam generator provides a steam flow rate of approximately 50 gallons per hour. In accommodating a range of actual crop windrow sizes, the intake was 2 ft. at its maximum height and 4 ft. across. In general terms the dimensions of the treatment chamber are governed by the windrow's size and to compliment associated hay-making equipment such as balers, rakes and windrows.

Various modifications may be made in details of design and construction without departing from the scope and ambit of the invention.

We claim:

1. A method of treating crop subsequent to cutting the crop and allowing said crop to fall on the ground, said method comprising the further step of subjecting the crop that is laying on the ground to steam treatment for a sufficient time to allow some of the steam to penetrate the structure of the leaf of the crop plant without moving, mechanically handling or disturbing the crop before steaming is commenced.

2. The method of claim 1 including completing the steam treatment before the crop is moved, mechanically handled or disturbed.

3. The method of claim 1 including the step of applying the steam from above the crop.

4. The method of claim 1 including the step of substantially enclosing in a progressive manner portions of said crop that is laying on the ground within chamber into which said steam is introduced.

5. The method of claim 4 wherein said chamber is moved continuously over said crop that is laying on the ground.

* * * * *

UNITED STATES PATENT AND TRADEMARK OFFICE
CERTIFICATE OF CORRECTION

PATENT NO.   :   4,991,342
DATED        :   February 12, 1991
INVENTOR(S)  :   Jack MAHER It is certified that error appears in the above-identified patent and that said Letters Patent is hereby corrected as shown below:

On the first page (title page) the Inventor information should read:

Item [75] Inventor:   -- Jack MAHER, deceased, late of Forbes, Australia, by Molly Veronica Maher, Robert James Maher, co-executors --.

Signed and Sealed this

Twenty-eighth Day of July, 1992

*Attest:*

DOUGLAS B. COMER

*Attesting Officer*    *Acting Commissioner of Patents and Trademarks*